United States Patent
Arajakis

(10) Patent No.: US 8,047,413 B2
(45) Date of Patent: Nov. 1, 2011

(54) MULTIFUNCTIONAL CARRIER DEVICE FOR HUNTING EQUIPMENT

(75) Inventor: Michael Arajakis, Toronto, OH (US)

(73) Assignee: Gameplan Gear, Inc., Boardman, OH (US)

( * ) Notice: Subject to any disclaimer, the term of this patent is extended or adjusted under 35 U.S.C. 154(b) by 1077 days.

(21) Appl. No.: 11/600,505

(22) Filed: Nov. 16, 2006

(65) Prior Publication Data

US 2007/0131728 A1    Jun. 14, 2007

Related U.S. Application Data

(60) Provisional application No. 60/597,634, filed on Dec. 14, 2005, provisional application No. 60/766,320, filed on Jan. 10, 2006, provisional application No. 60/766,687, filed on Feb. 6, 2006, provisional application No. 60/766,806, filed on Feb. 13, 2006.

(51) Int. Cl.
 *A45F 4/02* (2006.01)
(52) U.S. Cl. ..... 224/577; 224/155; 224/916; 206/315.11
(58) Field of Classification Search ............. 224/916, 224/584, 577, 153, 155, 581; 206/315.11, 206/317; D3/262
See application file for complete search history.

(56) References Cited

U.S. PATENT DOCUMENTS

| | | | |
|---|---|---|---|
| 4,480,774 A | 11/1984 | Smith et al. | |
| 4,610,641 A | 9/1986 | Allen | |
| 5,450,957 A | 9/1995 | Erb | |
| 5,465,887 A | 11/1995 | Hudson | |
| 5,555,664 A | 9/1996 | Shockley | |
| 5,782,531 A | 7/1998 | Shindle | |
| 5,893,502 A | 4/1999 | Redzisz | |
| 5,927,575 A | 7/1999 | Gatling | |
| 5,975,393 A * | 11/1999 | Bellamy | 224/655 |
| 6,135,333 A | 10/2000 | Tucker et al. | |
| 6,244,481 B1 | 6/2001 | Brougher | |
| 6,250,470 B1 * | 6/2001 | Mackenzie | 206/579 |
| 6,289,626 B1 | 9/2001 | Williams | |
| 6,290,114 B1 | 9/2001 | Berberian | |
| 6,471,054 B2 * | 10/2002 | Nevarez | 206/315.11 |
| 6,536,638 B1 * | 3/2003 | Gulmatico, III | 224/153 |
| 6,691,693 B1 | 2/2004 | Trussell, II | |
| 6,935,495 B1 | 8/2005 | Mc Kenzie | |
| 7,028,870 B2 * | 4/2006 | Valdez-Campbell | 224/153 |
| D528,791 S * | 9/2006 | Sides et al. | D3/262 |
| 7,568,599 B2 * | 8/2009 | Hall | 224/250 |
| 2007/0145089 A1 * | 6/2007 | Robert | 224/637 |
| 2007/0187444 A1 * | 8/2007 | Hajari | 224/155 |
| 2008/0047992 A1 * | 2/2008 | Fabian | 224/275 |

* cited by examiner

*Primary Examiner* — Justin Larson
(74) *Attorney, Agent, or Firm* — Daniel J. Schlue; Roetzel & Andress

(57) ABSTRACT

The present invention relates to soft, multifunctional carriers which transport equipment, such as hunting equipment, hunting bows, compound bows, hunting gear, camping gear, hiking gear and animal antlers for camping, fishing and/or hunting. The equipment can be placed on or hung from a tree or the like and act as a backrest or cushion and provide access to the equipment transported for hunting, camping or fishing purposes. The carrier can be utilized in conjunction with an elevated tree stand or as a storage area on or near ground level.

11 Claims, 11 Drawing Sheets

MULTIFUNCTIONAL CARRIER DEVICE FOR HUNTING EQUIPMENT

RELATED APPLICATION DATA

This application claims priority to previously filed U.S. Provisional Application No. 60/597,634, filed on Dec. 14, 2005 entitled "Tree Stand Backrest/Convertible Backpack", to previously filed U.S. Provisional Application No. 60/766,320, filed on Jan. 10, 2006 entitled "Tree-Attachable Rattling Antler Strap", to previously filed U.S. Provisional Application No. 60/766,687, filed on Feb. 6, 2006 entitled "Combination Bow Case and Treestand Backrest", and to previously filed U.S. Provisional Application No. 60/766,806, filed on Feb. 13, 2006 entitled "Combination Bow Case and Treestand Backrest". All are hereby incorporated by reference in their entirety.

BACKGROUND OF THE INVENTION

This invention relates to soft, multifunctional carriers which transport equipment, such as hunting equipment, hunting bows, compound bows, hunting gear, camping gear, hiking gear and animal antlers for camping, fishing and/or hunting. The equipment can be placed on or hung from a tree or the like and act as a backrest or cushion and provide access to the equipment transported for hunting, camping or fishing purposes. The carrier can be utilized in conjunction with an elevated tree stand or as a storage area on or near ground level.

Soft flexible bow cases and backpacks are known in the art and are used by hunters to transport bows from a hunter's vehicle to, for example, a location in the woods, such as a hunter's stand or blind where the hunter is camouflaged with the surrounding area. Such cases and backpacks are typically only for a single purpose such as carrying a bow or gear to the field.

Compound bows, archery bows and cross bows are used for hunting and include a mechanical pulley and cam with a stringing arrangement to reduce user effort and strength in propelling an arrow. The bow typically may have an attachment for carrying a quiver and arrows. The combination is especially bulky for transport. Further, some states and/or jurisdictions require disablement of the bow during transportation to discourage the poaching of animals. This is accomplished by making it more difficult to setup and employ the bow in a quick and efficient manner. Disablement of the bow requires one to stop to and engage the bow before properly utilizing the bow. These actions cause enough of a delay to allow a poached animal to escape.

Multifunctional bow cases and backpacks are known in the art for delivering or carrying the bow, case or pack and converting to another device or use. Examples of bow carriers include U.S. Pat. No. 6,691,693, which details a bow case and a detachable tree form blind, U.S. Pat. No. 5,893,502, which details a carrying case that converts into a hunting vest, U.S. Pat. No. 4,480,774, which details as a crossbow carrying case, U.S. Pat. No. 5,450,957, which details an archery bow case that doubles as a blind combination, and U.S. Pat. No. 6,935,495, which details a crossbow case. Examples of backpacks include U.S. Pat. No. 6,290,114, which details a backpack able to carrying a hunting bow, and U.S. Pat. No. 5,465,887, which details a backpack for an archery bow.

Examples of multifunctional or convertible backpacks include U.S. Pat. No. 6,244,481, which teaches a combination backpack and seat cushion, U.S. Pat. No. 5,927,575, which teaches a combination cushion and backpack, and U.S. Pat. No. 5,782,531, which teaches a cushion for use in wrapping around a tree.

Specialty carriers for carrying antlers into the field in a manner which causes minimal damage to the antlers, which allows for the hunter's safety and which creates a minimal amount of noise during transport are also known. Antlers are used in hunting as a means for attracting wild game into an area. In the most common use, antlers are attached to a tree and either scraped against the tree or cause noise by striking the antlers against one another. The antlers can be authentic antlers taken from a previously killed animal, naturally cast or shed antlers, or can be synthetically made or purchased. Once in the field there is a need to properly secure the antlers to make them accessible in the hunting location and so that they can be properly used in a short amount of time. Examples of antler securing apparatus include U.S. Pat. No. 6,289,626 which describes a remote controlled antler rattler, U.S. Pat. No. 5,555,664 which details another embodiment of a remote controlled antler rattler, U.S. Pat. No. 4,610,641 which details a synthetic antler for attracting animals, and U.S. Pat. No. 6,135,333 which teaches a pack for carrying hunting equipment employing a means of transporting antlers from a recently harvested deer.

While at a hunting or fishing location, the hunter or sportsman makes the area their temporary base of operations. This base of operations can be a cave, a wooded area, a marsh, or any other area which offers the protection sought. While at a location, the hunter must be quiet and still so as to not be seen by the game being hunted. A camouflaged or hidden area is desired, which may involve being camouflaged by trees. Trees can provide protection while the hunter is on the ground and seeking refuge in or behind a series of trees. The hunter may also be physically located in a tree stand as a tree stand allows the hunter to be 3 to 35 foot off of the ground and out of sight of the animal.

Since the hunter can expect to wait a significant amount of time for the game to enter the area, comfort becomes a key element in keeping still and being quiet. Devices which improve comfort aid the hunter. In addition, any device chosen must minimize noise, as even minute noises can scare off an animal.

Additionally, there exists a need for a storage system for the gear the hunter needs and has transported. This gear includes hunting calls, hunting scents, additional ammunition, food, and drink. Storing this equipment prevents the equipment from being damaged on the ground and prevents the area from appearing occupied and/or unnatural to potential game.

A combination or multifunctional device which allows for the transport of hunting equipment and provides other advantages such as comfort and storage for equipment is desired in the art.

SUMMARY OF THE INVENTION

The present invention generally relates to a multifunctional carrier device for hunting equipment. The combination or multifunctional device which allows for the transport of hunting equipment and provides other advantages such as comfort and storage for equipment is desired in the art.

The present invention is to a multipaneled carrier for an archery bow, capable of receiving and holding at least one archery bow, and having at least one means for storing accessories and a means for providing back support. The storing means and the back support means are interconnected to form a partial enclosure around the archery bow. The carrier also has a closed position to allow for transport of the carrier, and an open position to allow securing of the carrier to an object. The carrier employs a securing means for securing the partial enclosure in the closed position to transport the archery bow in a disabled state and a back support securing means for attaching the carrier in the open position to an object which maintains the back support means in a support position. The back support securing means allows the carrier to be attached to the object at multiple locations. Finally, the carrier has a strap for transporting the carrier.

The present invention also provides a multipaneled backpack capable of receiving and storing equipment and having a means for providing back support. The storing means and the back support means are interconnected to form a single continuous apparatus having a closed position that allows for transport of the backpack, and an open position that allows the securing of the backpack to an object. The backpack also employs a back support securing means for securing the backpack to an object with the back support securing means allowing for the backpack to be attached to the object at multiple locations and a transportation securing means for securing the backpack in a manner to permit transportation. Finally, the backpack has a means for transporting the backpack.

The present invention also provides an antler securing device comprising two or more interconnected straps with a tree securing means for attaching the interconnected straps to a tree or pole. In addition, an antler securing means is located at the end of the interconnected straps to attach a set of antlers, and padded handles are attached to the antler securing means to protect the antlers from damage and to provide comfort to a users hands.

DETAILED DESCRIPTION OF THE INVENTION

The present invention relates to a multifunctional carrier for transporting equipment, such as hunting equipment, to locations for hunting, fishing and/or camping, and which can be placed onto or hung from a tree or other similar area either above the ground or above the tree stand or seat to provide a cushioned backrest for the user, while providing a storage means for the hunting equipment which has been transported. Such a backrest can be utilized in an elevated tree stand, or can be employed at or near ground level. The devices are designed to carry hunting bows, compound bows, hunting gear, camping gear, hiking gear, fishing gear and/or animal antlers. The devices can be combined in various manners, depending on the preference of the user.

Figure 1:
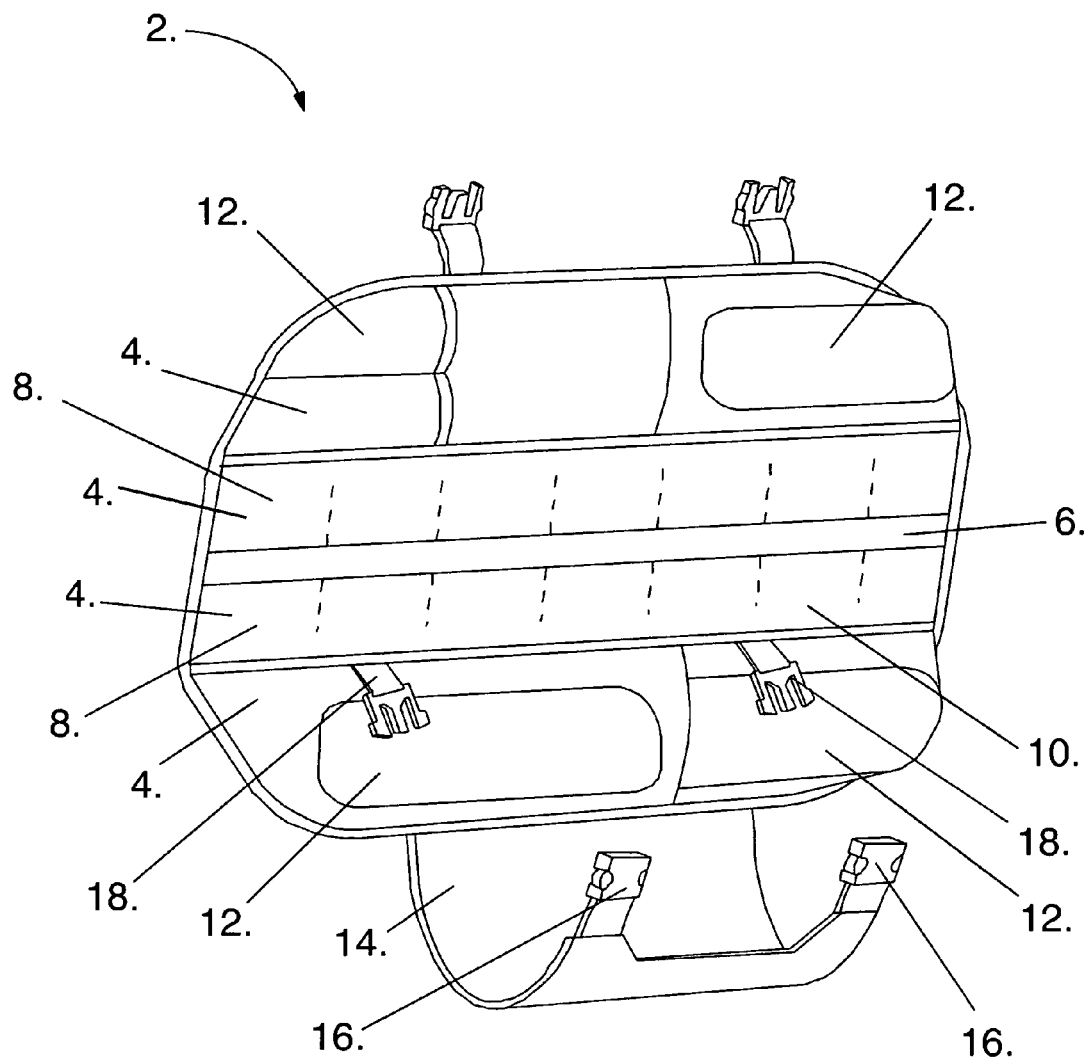
FIG. 1 is a drawing of the multipaneled carrier for an archery bow in an open position.

The multifunctional carrier for an archery bow 2 is shown generally in FIG. 1. The carrier or device consists of multiple panels 4, interconnected by at least one hinge 6. These hinges 6 can be, but are not limited to, a fabric such as nylon or cotton. One or more of the center panels is padded 8. This padding can be, but is not limited to, cotton, felt, foam, feathers or any other material which would provide an adequate means of comfort to a person. The padding is surrounded by a covering made from a material 10 such as cotton, nylon, rayon, or any other material that adequately encloses the padding. The material 10 allows for the noise to be minimized when rubbed or scraped against by a hunters clothing, and prevents noise from rubbing directly against the tree, as such noises are detrimental in the sport of hunting. While only one hinge 6 is shown, there could be more than one hinge employed. Since the purpose of the hinge is to allow the panels to be placed around the bow and around a tree once the hunter arrives at the desired location. The number of hinges will vary depending upon the stiffness of the fabric material employed with the carrier.

Located on the outermost panels immediately adjacent to the padded panels 8, are compartments for storage 12. These compartments 12 can be made from mesh, screen, cloth, or any other suitable fabric. The compartments 12 can be an open pocket or a closed pocket device, closeable by a snap, buckle, zipper or suitable fastener. The device contains a wing 14 attached to one end panel. The wing 14 is used to envelop an archery bow, the device typically surrounding the drawstrings of the bow. This wing 14 is typically made from a cotton, canvass or nylon fabric, but can be made from any suitable material.

Figure 2:
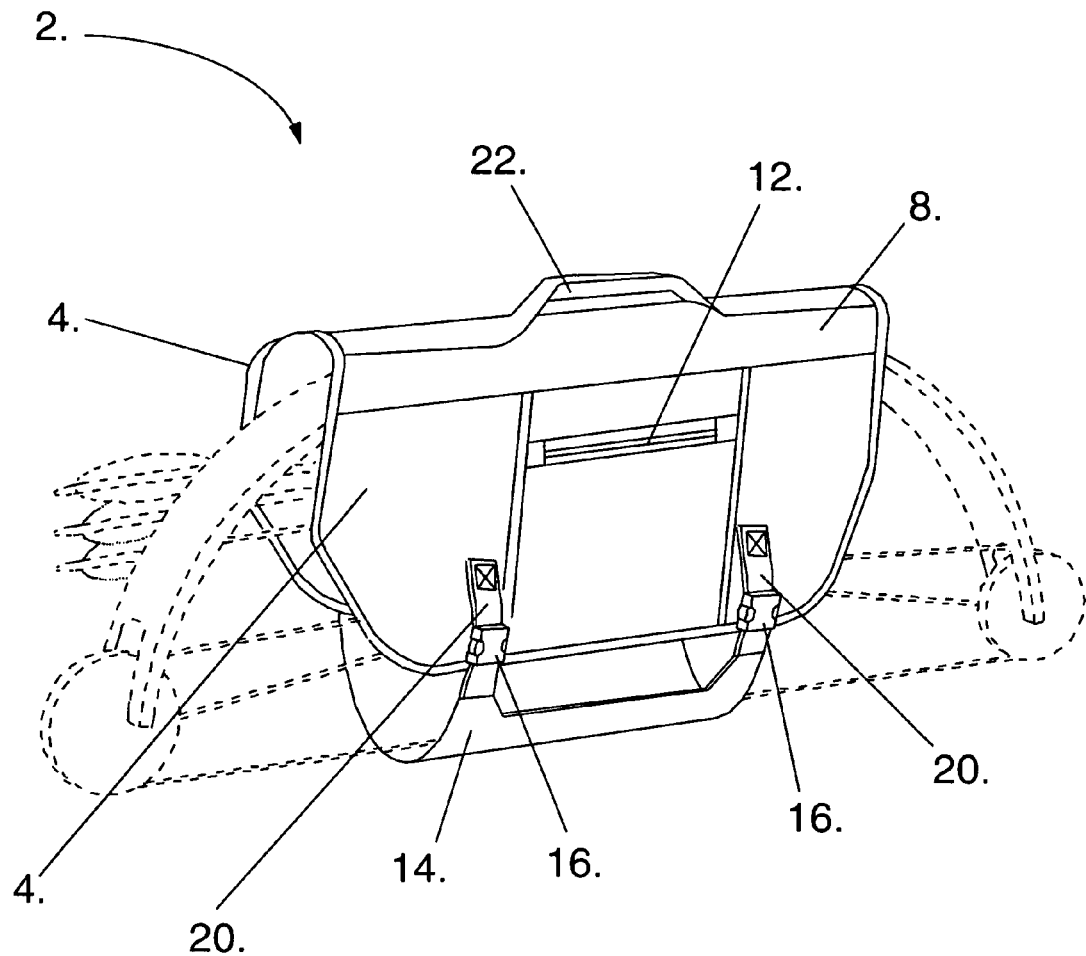
FIG. 2 is a drawing of the multipaneled carrier for an archery bow in a closed position.

As shown in FIG. 2, attached to the wing 14 are fastening apparatus 16 such as buckles, straps, magnetic devices, hook and loop fasteners, belts or any suitable material. These fastening apparatus 16 allow the multifunctional carrier 2 to envelope the bow. The fastening apparatus can be attached to the internal fastening apparatus 18 typically used for attachment to the tree or an external fastening apparatus 20.

FIG. 2 details the carrier in closed or transport mode. When a bow is placed into the middle of a closed device, the bow can be transported into a hunting area via the attached handle 22, or a shoulder strap. While in the transport mode shown in FIG. 2 the bow is in a disabled state, meaning the bow cannot be fired without taking an additional step. The typical means of disablement involves a limitation on the opening action of the bow. As stated prior, an additional step is needed to prepare the bow for use when it is in the carrier as shown in FIG. 2. The carrier 2 wraps the bow in a horizontal fashion to create this disablement and thus is an advantage in areas or jurisdictions where bows must be transported in a disabled state. States or municipalities typically enact hunting laws to discourage poaching by enacting a transportation requirement that the bow is transported in a disabled or fully enclosed or encased state. The carrier 2 provides a means to allow for transportation in a disabled and/or encased state. In areas where a full encasement is necessary, the design can be modified or altered to include a cover to provide a full encasement of the wheels of the bow. Such a full encasement may include but is not limited to a cover with a zipper, a series of snaps, a series of buckles and/or a hook and loop type device.

Figure 3:
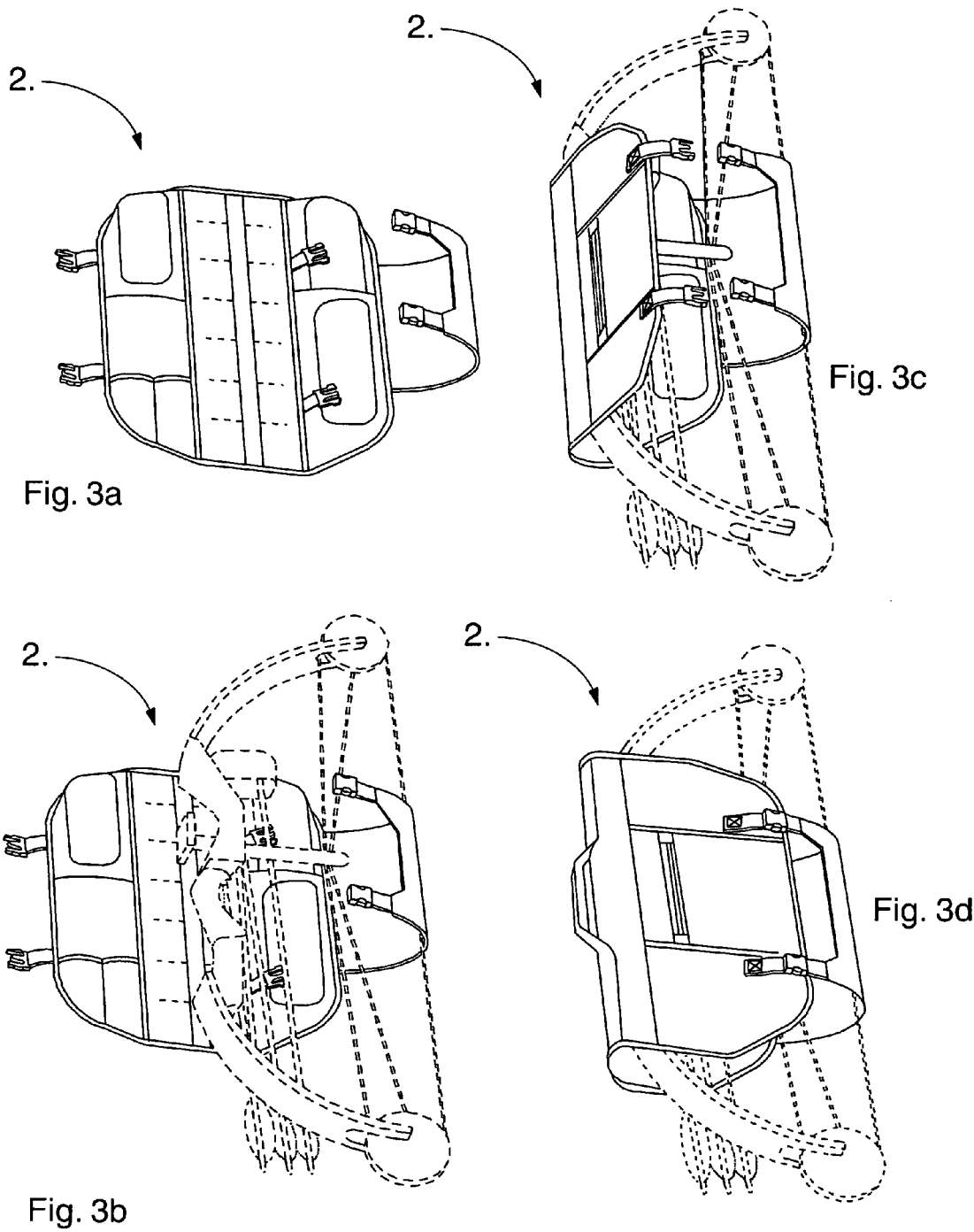
FIG. 3 is a drawing of the multipaneled carrier for an archery bow detailing the carrier receiving the bow and placing it in a position for transport.

FIGS. 3a-3d show the steps of placing the bow into the multipaneled carrier and closing the carrier. As shown, the carrier 2 is laid open as shown in FIG. 3a, the bow is then placed into the carrier, the fabric wing 14 is wrapped around the bow's drawstrings as shown in FIGS. 3b and 3c, and the fastening devices 16 are secured as shown in FIG. 3d. The transport mode is detailed in FIG. 3d.

Figure 4:
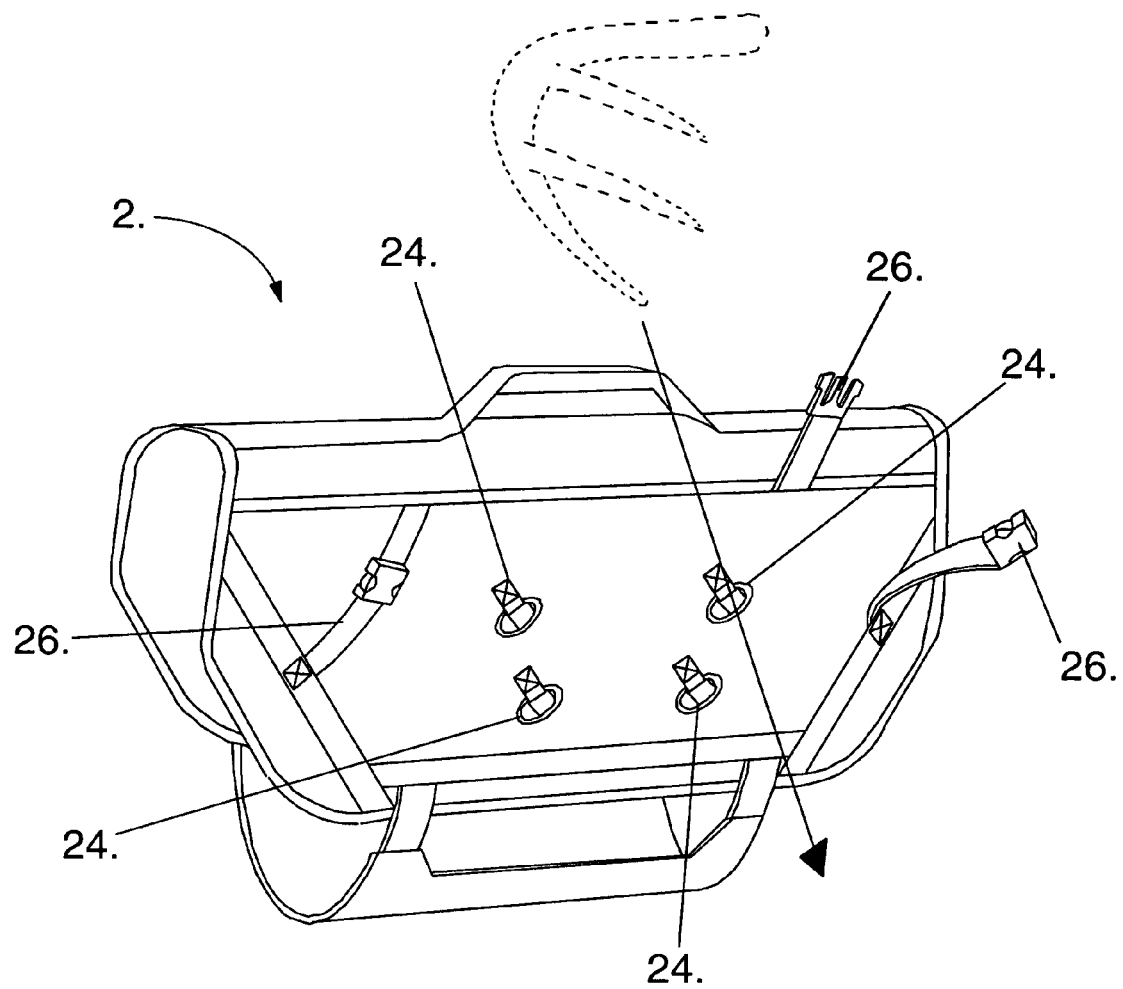
FIG. 4 is a drawing of the multipaneled carrier for an archery bow showing an animal antler being placed into the external fasteners.
Figure 5:
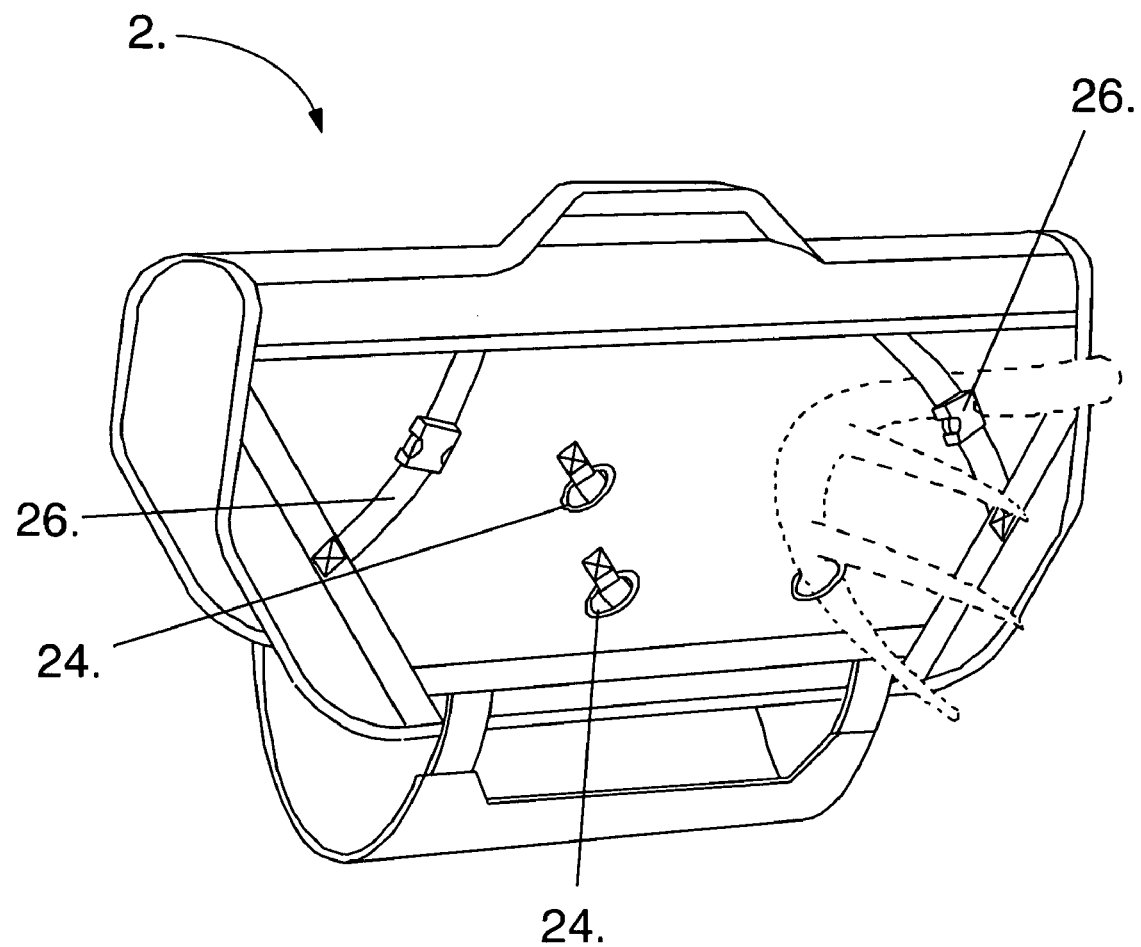
FIG. 5 is a drawing of the multipaneled carrier for an archery bow detailing an animal antler secured externally and the carrier being ready for transport.

Loop attachments 24 are located externally on the multipaneled carrier 2. FIGS. 4 and 5 detail the loop attachments 24. These loops can transport a variety of hunting or camping apparatus, but are particularly suited for securing and transporting deer or other animal antlers. The loop attachments 24 providing the first mode of securing while a series of straps and buckles 26 provided a secondary mode of securing. The straps or buckles 26 serving the dual purposes of a secondary securing means for externally secured items and as a means for attaching the carrier to a tree or pole.

Figure 6:
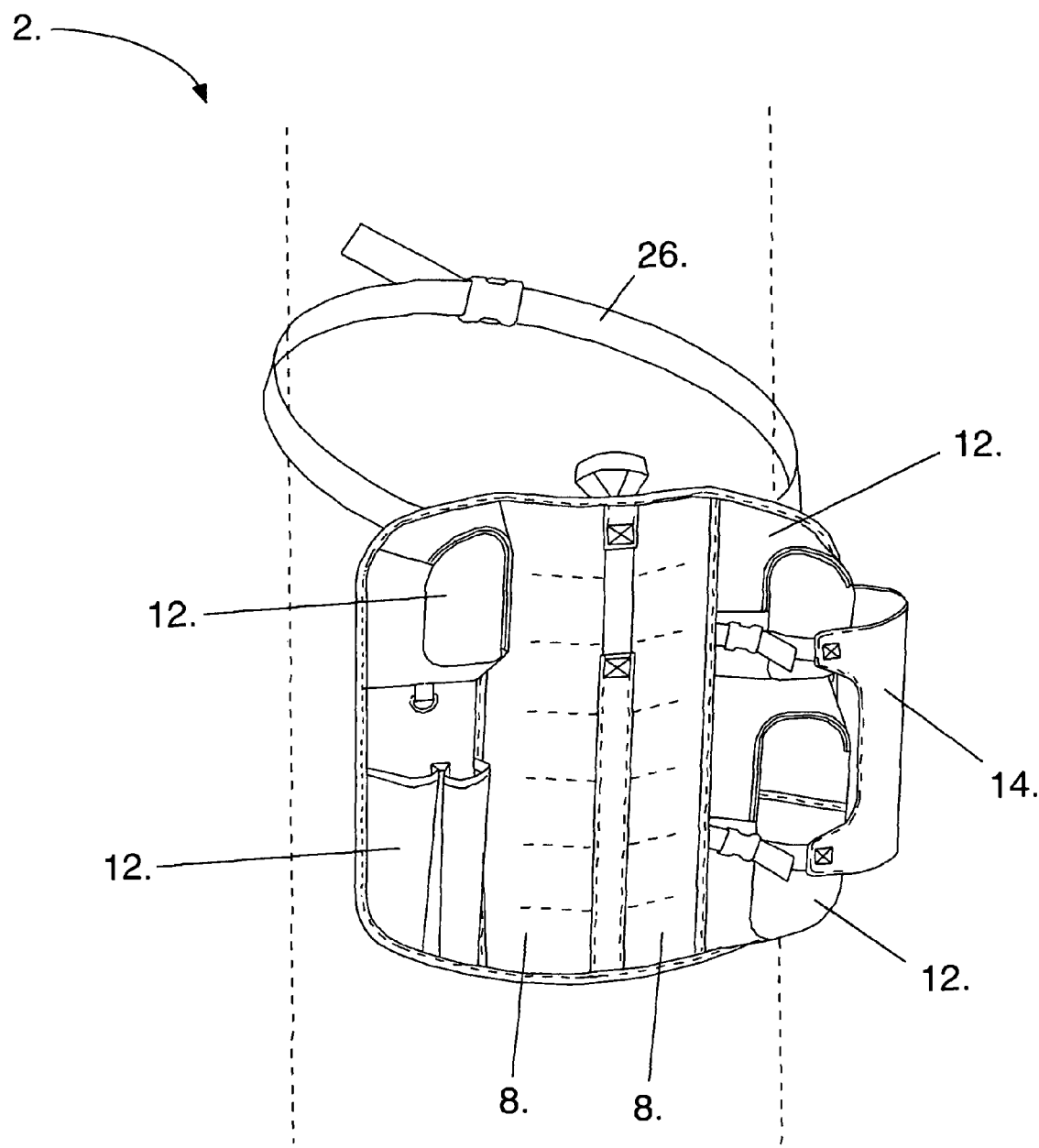
FIG. 6 is a drawing of the multipaneled carrier for an archery bow shown attached to a tree and the carrier able to be used as a back support and/or a storage device.

FIG. 6 shows the carrier 2 attached to a pole or a tree. The bow is removed from the carrier or device 2 and the handle 22 is placed against a tree or pole. The straps and buckles 26 encircle the pole and are connected on the opposite side. FIG. 6 shows the device in the open mode. The pad(s) 8 providing comfort to the hunter to lean against a tree or pole while standing or sitting next to a tree or pole or while sitting or standing in a device such as a deer blind. When attached to a tree or pole the hunter has access to the storage compartments 12 and can use the fabric wing 14 to secure items such as additional arrows.

Figure 7:
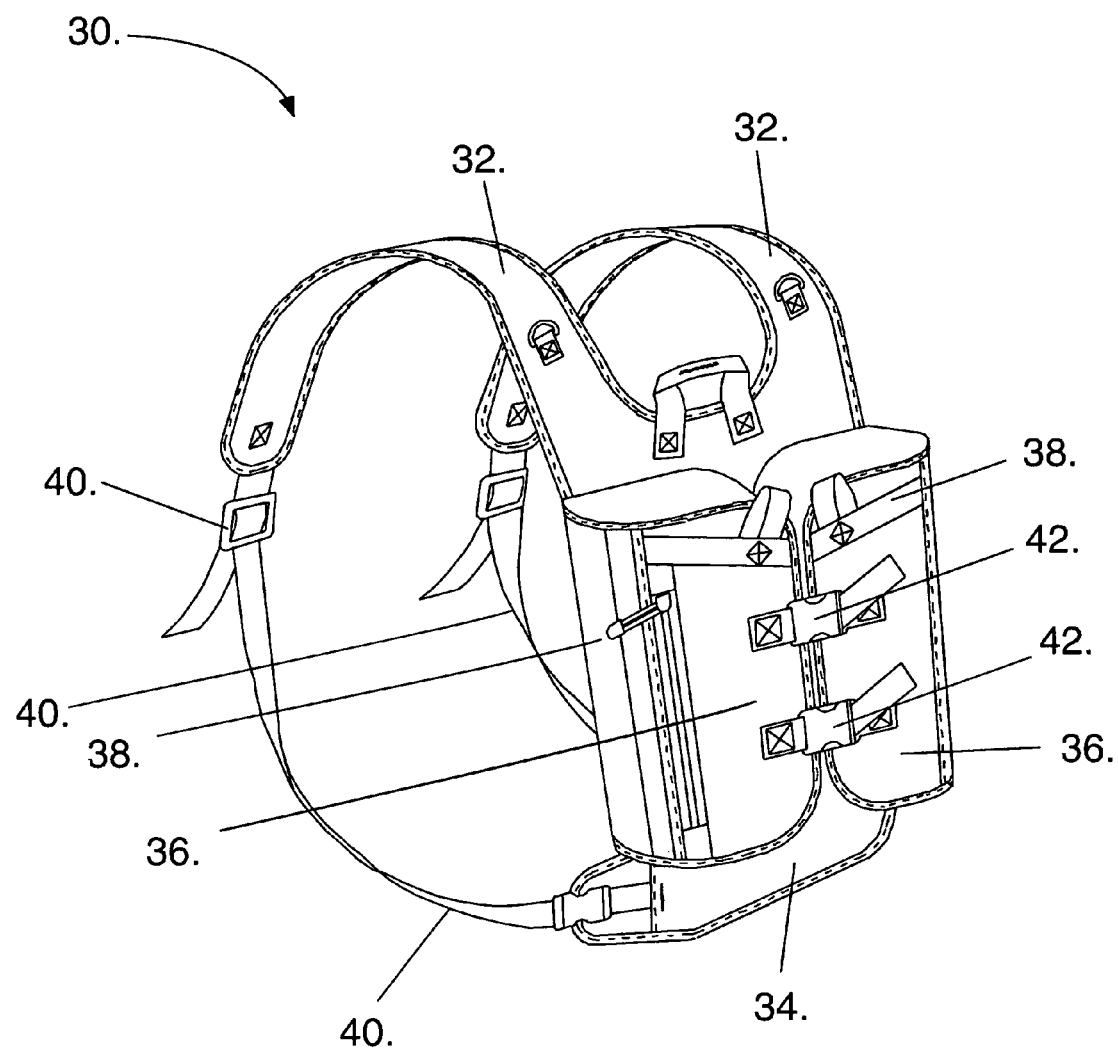
FIG. 7 is a drawing of the multipaneled backpack shown closed and in a position ready for transport.
Figure 8:
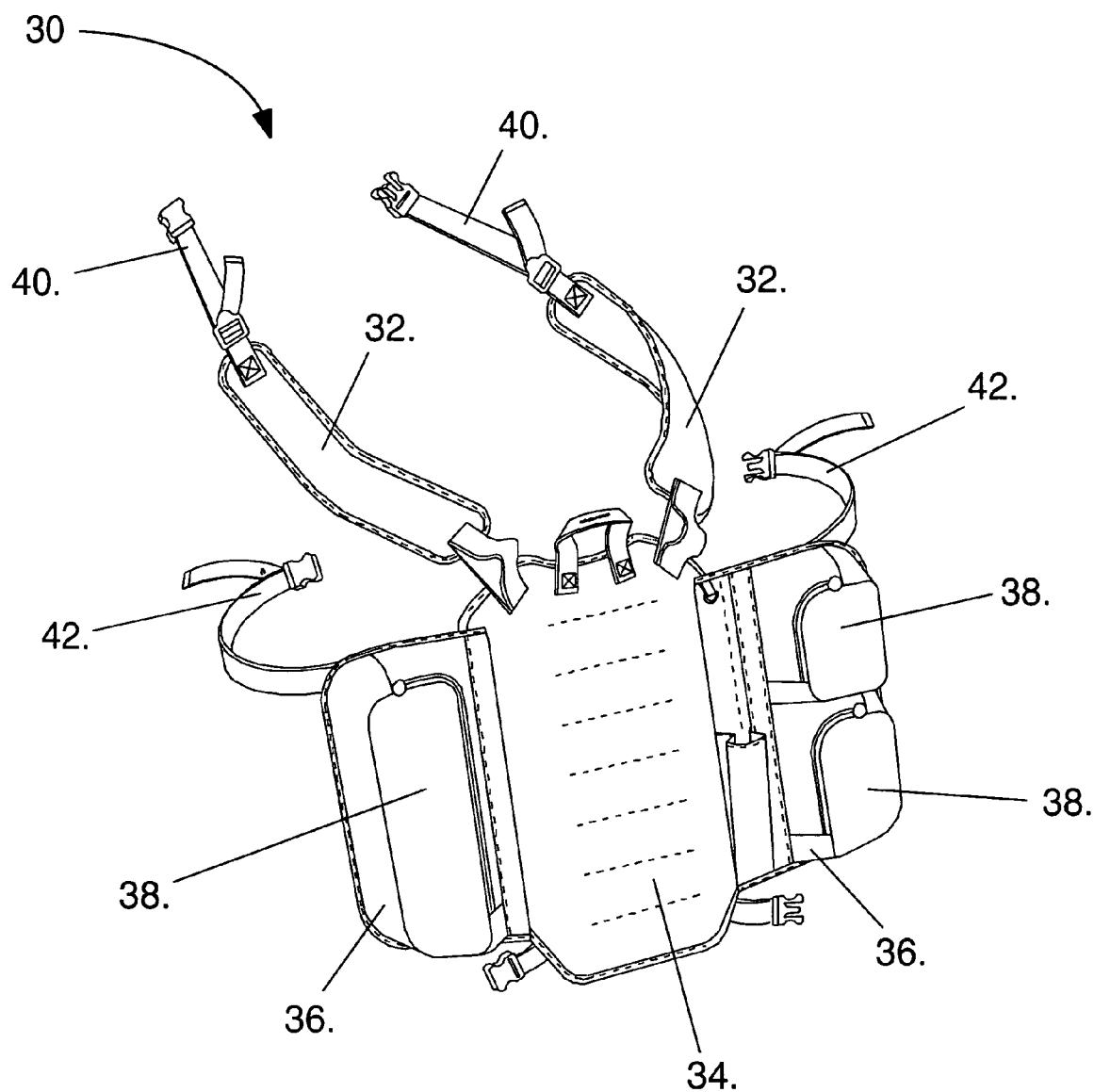
FIG. 8 is a drawing of the multipaneled backpack shown in an open position.
Figure 9:
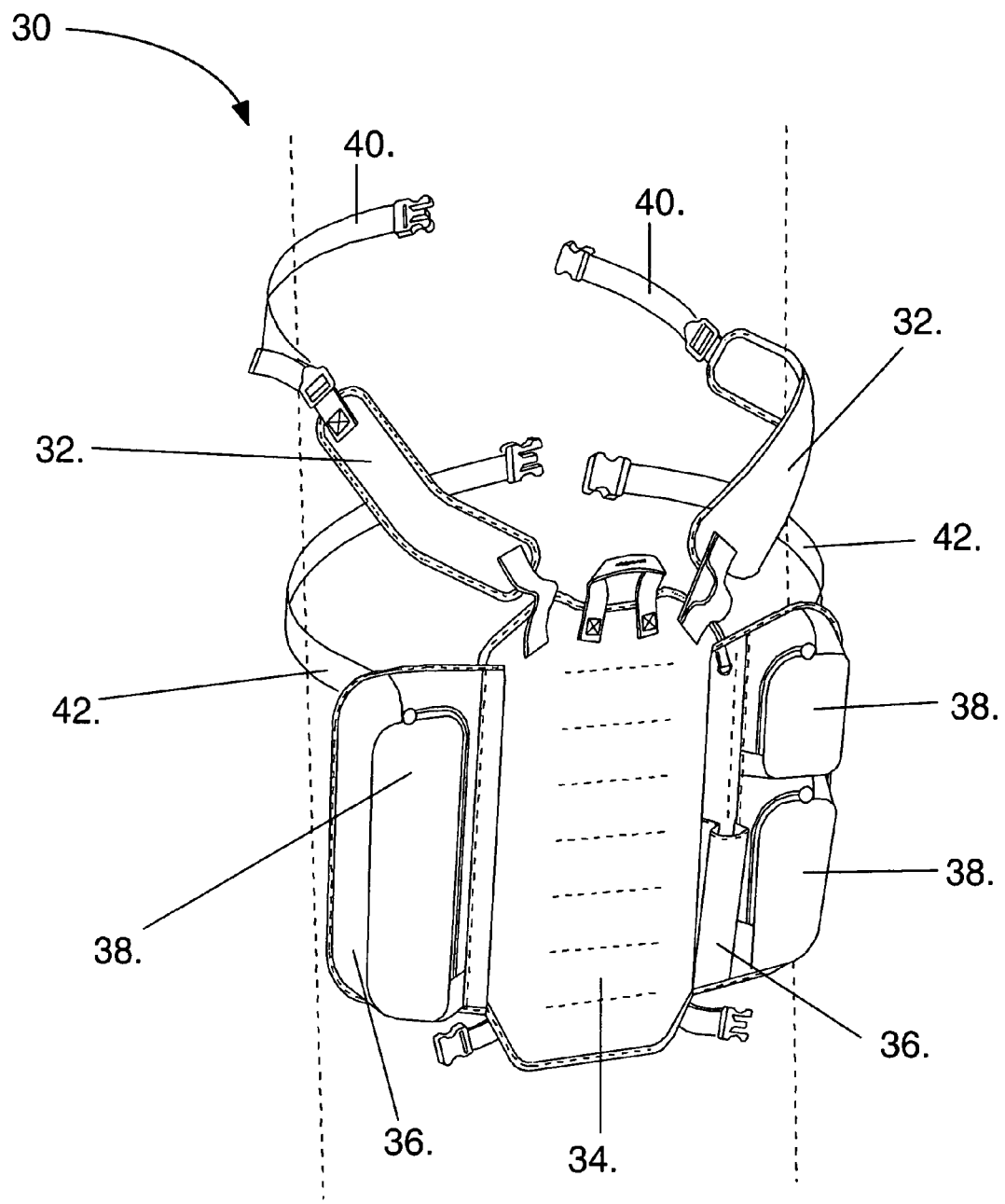
FIG. 9 is a drawing of the multipaneled backpack shown attached to a tree.

The multipaneled backpack 30 is used in a similar manner and mode as the carrier 2. The multipaneled backpack 30 is detailed in FIGS. 7 and 8. The backpack can be carried as a standard backpack or knapsack and serves the dual purpose of opening into a storage device and as a padded comfort aid. In one embodiment the backpack 30 utilizes two straps 32 for use over a person's shoulders. The backpack 30 has a padded backrest 34 or panel in the middle of the backpack. This backrest 34 is made from a pad such as, but not limited to, cotton, felt, foam, feathers or any other material which would provide an adequate means of providing comfort. The pad 34 is covered with a material such as cotton, nylon or any other suitable fabric. The pad serves a primary purpose of providing comfort to the user while the backpack 30 is being carried and serves a secondary purpose as a comfort means when the backpack 30 is employed as a cushion rest. Immediately adjacent to the panel(s) containing the padding are the backpack storage panels 36. In one embodiment there are two panels 36, one on either side of the padded backrest 34. These panels employ a series of open or closed pocketed compartments 38. In one embodiment, the pockets 38 being closeable by a snap, zipper or other type fastener. One example shown in FIG. 7 details the backpack 30 in the closed mode for transport while FIG. 8 details the backpack in the open mode used to secure the backpack 30 to a tree and/or pole. In this embodiment, attached to the two main straps 32 are a series of adjustable belts, buckles or fasteners 40 used to create a transportable apparatus. These adjustable belts, buckles or fasteners 40 are utilized to secure the backpack in the open mode to the tree or pole as the straps 40 become the uppermost securing device. A second set of adjustable belts, buckles or fasteners 42 are utilized at a lower level to secure and stabilize the backpack to the tree or pole. This second set of adjustable belts, buckles or fasteners 42 is used to secure the backpack from opening while in transport mode. Various placements of these belts, buckles or fasteners 40, 42 on the backpack 30 are possible based on the users preferences and are not limited by any one method. In another embodiment the adjustable belts, buckles and fasteners 40, 42 can also include hook and loop fasteners, snaps, hooks, or magnetic attachments. FIG. 9 details the backpack 30 as secured to a tree or pole.

Figure 10:
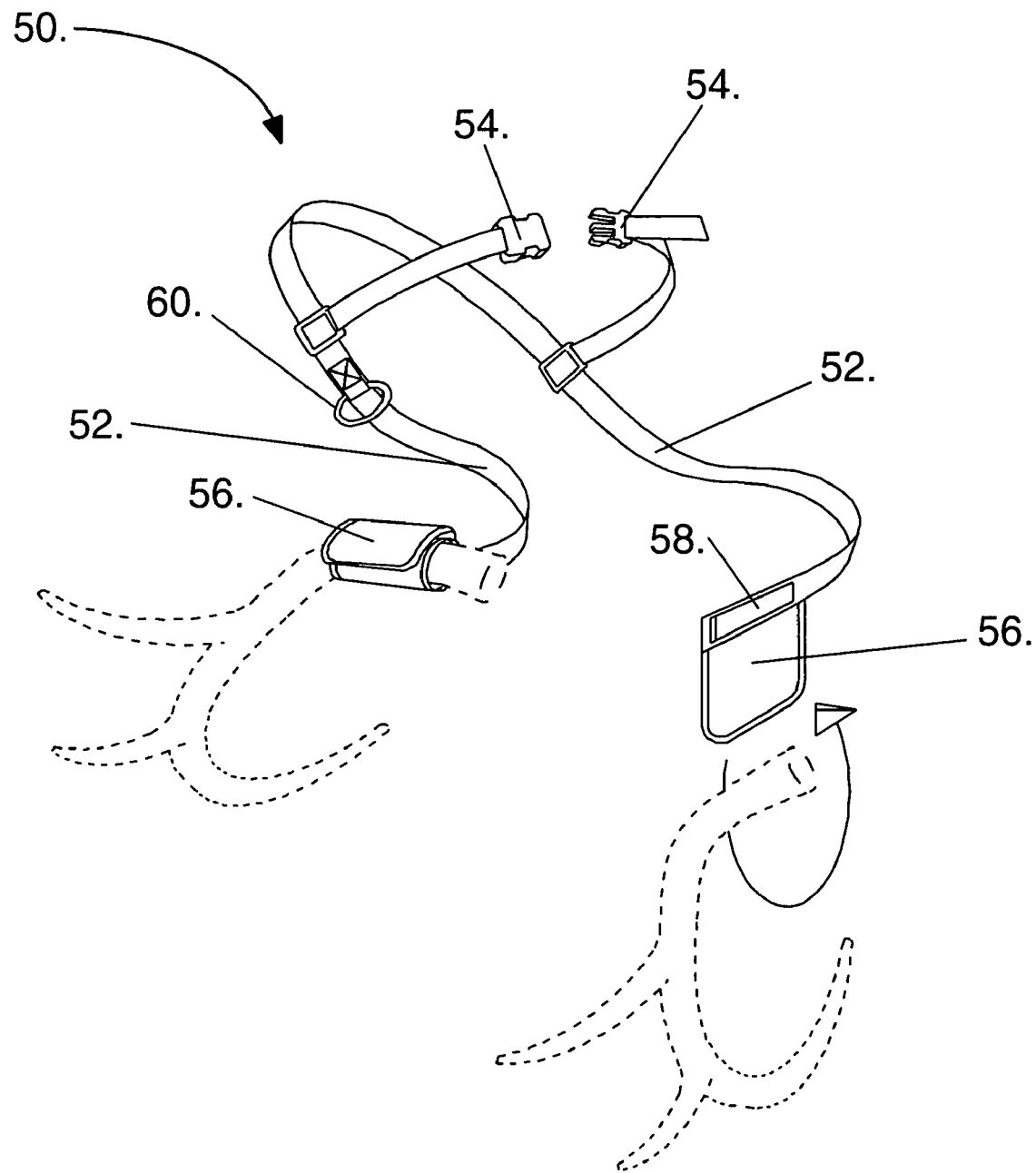
FIG. 10 is a drawing of the means for securing antlers detailing the device and the position of the antlers.
Figure 11:
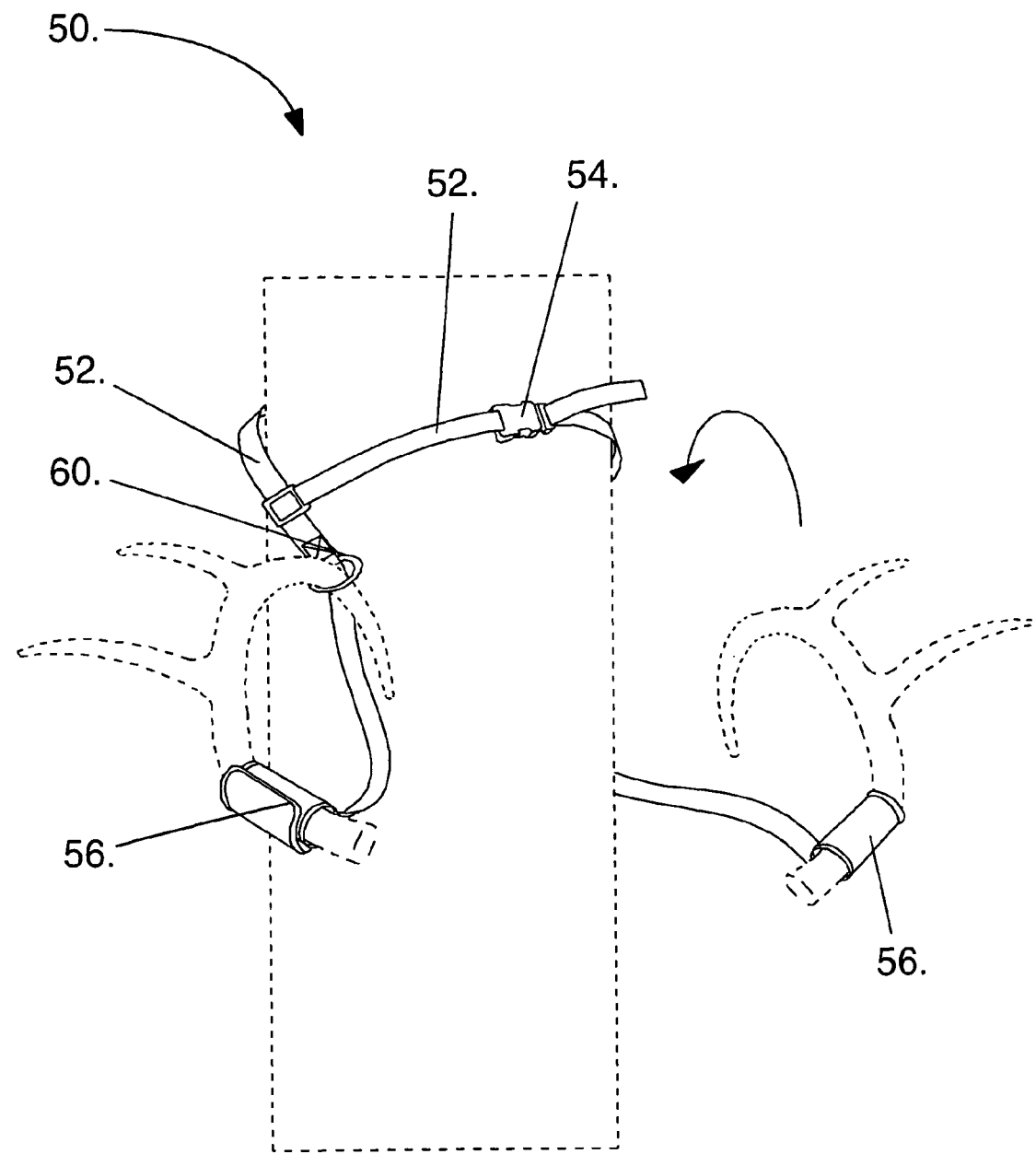
FIG. 11 is a drawing of the means for securing antlers detailing the device and the position of the antlers when secured to a tree.

The antler securing device 50 is a series of straps, handles, securing means, comfort means and buckles as detailed in FIGS. 10 and 11. The antler securing device is formed from a nylon, cotton or other suitable type of material strap 52. The strap connected to one or more belts or buckles 54 at one end and an antler handle securing means 56 at the opposite end. The antler handle securing means 56 being made from a material such as, but not limited to cotton, nylon or rayon. The antler handle securing means 56 wrapping around an animal antler with a securing means such as hook and loop 58 and/or buckles or straps. In order to secure and store the antlers, one or more loops 60 made from rubber, fabric or other similar means are employed. These loops 60 provide an additional securing point that prevent excessive sway or swinging of the antlers. The antlers can be grasped by the handle securing means 56 and rubbed or scraped against the tree or against one another. The antlers can then be returned to a storage position by inserting the antlers into the loops 60.

What is claimed is:

1. A multifunctional carrier for transporting an archery bow and converting to a back support comprising:
   four interconnected panels each including an interior and exterior surface and arranged such that two innermost panels are connected along respective first sides thereof by a hinge and two outermost panels are connected along respective second sides of the innermost panels, said second sides being opposite said first sides;
   the two innermost panels being padded;
   the four panels being adapted to receive and hold at least one archery bow when folded about the hinge in a first position;
   a wing attached to a first outermost panel along a side of the outermost panel opposite from the side that is connected to the respective innermost panel;
   at least one first fastener attached to the wing;
   at least one second fastener attached to the exterior surface of a second outermost panel;
   the at least one second fastener being adapted to fixably connect with or fasten to the at least one first fastener thereby securing the carrier in said first position;
   at least one third fastener attached to the interior surface of one of the panels and adapted to fixably connect with or fasten to the at least one first fastener thereby securing the carrier in a second position in which the carrier can be secured to an object and function as a back support;
   at least one compartment for storing accessories; and
   a strap for transporting the carrier.

2. The multifunctional carrier of claim 1, wherein the wing and first fastener includes a fabric attachment to protect the bowstring of the archery bow.

3. The multifunctional carrier of claim 1, wherein the compartment for storing accessories is located adjacent to the panels allowing access to the accessories while in the second position.

4. The multifunctional carrier of claim 1, wherein an outer surface of the multifunctional carrier contains an outer securing means for the storage of additional items.

5. The multifunctional carrier of claim 4, wherein the outer securing means are rubber loops.

6. The multifunctional carrier of claim 1, wherein the strap is an adjustable shoulder harness.

7. The multifunctional carrier of claim 1, wherein the strap is an adjustable handle.

8. The multifunctional carrier of claim 1, wherein the object is a tree.

9. The multifunctional carrier of claim 1, wherein the object is a hunting stand.

10. The multifunctional carrier of claim 1, wherein the wing and the at least one first fastener has one or more adjustable straps and a strap securing means.

11. The multifunctional carrier of claim 1, wherein the at least one compartment is a closed pocket device, closeable by a snap, buckle, or zipper.

* * * * *